United States Patent
Hashiba et al.

(10) Patent No.: US 7,623,947 B2
(45) Date of Patent: Nov. 24, 2009

(54) ABNORMALITY DETERMINING APPARATUS FOR VEHICLE MOTION CONTROL APPARATUS

(75) Inventors: Hitoshi Hashiba, Kariya (JP); Kazunori Sakai, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 551 days.

(21) Appl. No.: 11/594,922

(22) Filed: Nov. 9, 2006

(65) Prior Publication Data

US 2007/0129861 A1 Jun. 7, 2007

(30) Foreign Application Priority Data

Dec. 1, 2005 (JP) ............................ 2005-347403

(51) Int. Cl.
*B60T 8/34* (2006.01)
*B01M 17/00* (2006.01)
*G06F 19/00* (2006.01)

(52) U.S. Cl. ............................ 701/29; 701/34; 701/38; 73/117.2

(58) Field of Classification Search ............ 701/29, 701/33, 34, 38, 32; 73/117.3; 123/90.17; 280/5.501
See application file for complete search history.

(56) References Cited

U.S. PATENT DOCUMENTS

| 7,082,357 B2 * | 7/2006 | Fujita et al. .................... 701/29 |
| 7,311,314 B2 * | 12/2007 | Kasamatsu ............... 280/5.501 |
| 2004/0102888 A1 | 5/2004 | Burgdorf et al. |

FOREIGN PATENT DOCUMENTS

JP 2004-506572 3/2004

* cited by examiner

*Primary Examiner*—Tan Q Nguyen
(74) *Attorney, Agent, or Firm*—Buchanan Ingersoll & Rooney PC

(57) ABSTRACT

An abnormality determining apparatus is applied to a vehicle motion control apparatus in which a vehicle behavior sensor (yaw rate sensor, etc.) is integrally mounted to an integrated unit that is integrally composed of an HU (hydraulic unit) and ECU. In this abnormality determining apparatus, the pattern of the vibration noise appearing on the output from the vehicle behavior sensor (output from yaw rate sensor Yrfilpc, etc.) is obtained when various actuators such as motor, solenoid valves, or the like, that are mounted to the HU, are operated with a predetermined pattern for a primary check for the HU. When the pattern of the vibration noise is not within the predetermined normal pattern range, it is determined, according to the abnormal manner of the pattern of the vibration noise, that the abnormality of the vehicle behavior sensor, abnormal operation of the actuator in the HU, or the like occurs.

13 Claims, 10 Drawing Sheets

ABNORMALITY DETERMINING APPARATUS FOR VEHICLE MOTION CONTROL APPARATUS

CROSS REFERENCE TO RELATED APPLICATION

This application is based on and claims under 35 U.S.C. sect, 119 with respect to Japanese Patent Application No. 2005-347403 filed on Dec. 1, 2005, the entire content of which is incorporated herein by reference.

BACKGROUND OF THE INVENTION

1. Field of the Invention

The present invention relates to an abnormality determining apparatus for a motion control apparatus, the abnormality determining apparatus being applied to a vehicle motion control apparatus provided with a control unit having mounted thereto an actuator for controlling a vehicle motion and a vehicle behavior sensor arranged integral with the control unit and outputting a signal indicating a behavior of the vehicle, and determining whether abnormality occurs or not relating to the motion control apparatus.

2. Description of the Related Art

Conventionally, there has been widely known a vehicle motion control apparatus that controls the vehicle motion (attitude) through the control of the hydraulic braking force of the vehicle. In general, the motion control apparatus is configured to include a control unit (hydraulic unit (HU)) having mounted thereto various actuators (motor, solenoid valve, or the like) for controlling the hydraulic braking force of the vehicle; vehicle behavior sensor (yaw rate sensor, and the like) that outputs a signal indicating the behavior of the vehicle; and an electronic control apparatus (ECU) for controlling the actuators on the basis of the output from the vehicle behavior sensor.

In order to achieve a space saving of the entire motion control apparatus and reduction in production cost, a technique has recently been developed for incorporating the vehicle behavior sensor into an integrated unit composed integrally of the hydraulic unit and ECU (e.g., see following patent reference 1).

[Patent Reference 1]

Japanese Translation of Unexamined Patent Application No. 2004-506572

Vibration is generated on the integrated unit (specifically, hydraulic unit and ECU) due to the operation of the actuators mounted thereto. Therefore, when the vehicle behavior sensor is incorporated into the integrated unit (i.e., when the vehicle behavior sensor is integrally mounted to the hydraulic unit and ECU), the vibration can directly be transmitted to the vehicle behavior sensor.

As a result, the vibration noise can greatly be superimposed on the output from the vehicle behavior sensor, whereby the vehicle motion control may not be executed appropriately. Therefore, the integrated unit (accordingly, hydraulic unit and ECU) is generally fixed to the vehicle body via an elastic structural member made of a bracket, mount, and the like, as disclosed in the above-mentioned reference. With this configuration, the vibration transmitted to the vehicle behavior sensor is damped, whereby the vibration noise superimposed on the output from the vehicle behavior sensor can be reduced.

Meanwhile, in the hydraulic unit, the actuators mounted to the hydraulic unit are generally operated with a predetermined pattern immediately before the start of the engine (accordingly, immediately after the start of the electric power supply to the integrated unit) in order to execute a failure check of the apparatus (specifically, a check for disconnection, short-circuit, or the like, so-called primary check (hereinafter referred to as "PC")).

The vibration caused by the operation of the actuators is inevitably transmitted to the vehicle behavior sensor even during the time that the actuators are operated with this primary check, resulting in that the vibration noise appears on the output from the vehicle behavior sensor. The present inventor has found a technique for detecting abnormality involved in the motion control apparatus by positively utilizing the vibration noise appearing on the output from the vehicle behavior sensor.

SUMMARY OF THE INVENTION

An object of the present invention is to provide an abnormality determining apparatus of a vehicle motion control apparatus that can effectively determine whether abnormality involved in the motion control apparatus occurs or not by utilizing vibration noise appearing on the output from a vehicle behavior sensor integrally mounted to a control unit, when an actuator mounted to the control unit (hydraulic unit, etc.) of the vehicle motion control apparatus is operated with a predetermined pattern upon a primary check or the like.

The abnormality determining apparatus for the vehicle motion control apparatus is applied to a vehicle motion control apparatus provided with a control unit having an actuator (motor, solenoid valve, etc.) mounted to a vehicle body via an elastic structural member (bracket, mount, etc.) for controlling a vehicle motion ((hydraulic) braking force, etc.); the vehicle behavior sensor (yaw rate sensor, etc.) integrally mounted to the control unit; and control means for controlling the actuator on the basis of the output from the vehicle behavior sensor.

The feature of the abnormality determining apparatus of the vehicle motion control apparatus according to the present invention is such that it has abnormality determining means for determining whether abnormality involved in the motion control apparatus occurs or not on the basis of whether the variation pattern of the output from the vehicle behavior sensor is within a normal pattern range or not during the time that the actuator is operated with a predetermined pattern.

When the abnormality involved in the motion control apparatus does not occur, the variation pattern (pattern of vibration noise) of the output from the vehicle behavior sensor in case where the actuator mounted to the control unit is operated with a predetermined pattern can be reproduced within the range of a certain pattern having a frequency and gain corresponding to the operation of the actuator. The range of this pattern can be obtained beforehand through an experiment.

Therefore, if the aforesaid range of the pattern is handled as the normal pattern range, it can be determined that the abnormality involved in the motion control apparatus does not occur when the variation pattern of the output from the vehicle behavior sensor is within the normal pattern range, while it can be determined that the abnormality involved in the motion control apparatus occurs when the variation pattern of the output from the vehicle behavior sensor is out of the normal pattern range.

The foregoing configuration is based upon this finding. With this configuration, the abnormality involved in the motion control apparatus can effectively be detected by positively utilizing the vibration noise of the vehicle behavior sensor.

In this case, the abnormality determining means is preferably configured to make the determination of abnormality by operating the actuator with the predetermined pattern at a prescribed timing (e.g., upon the primary check) immediately after the electric power supply to the motion control apparatus (e.g., immediately after ON of an ignition switch). In other words, the determination of abnormality is preferably performed on the basis of the variation pattern of the output from the vehicle behavior sensor during the time that the actuator is operated with the predetermined pattern for the primary check. With this configuration, the abnormality involved in the motion control apparatus can be found in the early stages, and hence, the action for eliminating the abnormality involved in the motion control apparatus can be started in the early stages. It is to be noted that the prescribed timing may be the time before the vehicle starts running and the time immediately after the vehicle starts running.

The abnormality determining means is configured to determine, for example, whether abnormality of the vehicle behavior sensor occurs or not, whether the abnormal operation of the actuator occurs or not, and whether the abnormality involved in mounting the control unit occurs or not. The abnormality involved in mounting the control unit includes the abnormal connection of a hydraulic pipe connected to the control unit.

When the control unit is provided with plural vehicle behavior sensors and the variation pattern of the output from some of the plural behavior sensors is out of the normal pattern range, the abnormality determining means is preferably configured to determine that the abnormality involved in the aforesaid some of the vehicle behavior sensors occurs.

When the variation pattern of the output from some of the plural vehicle behavior sensors is out of the normal pattern range, the variation pattern of the output from the remaining vehicle behavior sensors is within the normal pattern range. The fact that the variation pattern of the output from at least one of the plural vehicle behavior sensors is within the normal pattern range is considered to mean that the abnormality involved in the motion control apparatus relating not to the vehicle behavior sensors (e.g., abnormal operation of the actuator, etc.) does not occur.

Therefore, in this case, it is considered that the abnormality involved in the aforesaid some of the vehicle behavior sensors occurs. The foregoing configuration is based upon this finding. With this configuration, the abnormality of the vehicle behavior sensors can effectively be detected, when the control unit is provided with plural vehicle behavior sensors.

When the control unit is provided with plural vehicle behavior sensors and the variation pattern of the output from all of the plural behavior sensors is out of the normal pattern range, the abnormality determining means is preferably configured to determine that the abnormality involved in the motion control apparatus other than the vehicle behavior sensors occurs.

In general, it is rare that the abnormality occurs simultaneously on the plural vehicle behavior sensors. In this case, it is considered that the variation pattern of the output from all of the plural vehicle behavior sensors is deviated from the normal pattern range, which is caused by the abnormality (e.g., abnormal operation of the actuator, etc.) involved in the motion control apparatus other than the plural vehicle behavior sensors. The foregoing configuration is based upon this finding. With this configuration, the abnormality involved in the motion control apparatus other than the plural vehicle behavior sensors (e.g., abnormal operation of the actuator, etc.) can effectively be detected, when the control unit is provided with plural vehicle behavior sensors.

In the abnormality determining apparatus according to the present invention, the abnormality determining means is preferably configured to determine that the abnormality involved in the motion control apparatus occurs, when the frequency that is obtained on the basis of the variation pattern of the output from the vehicle behavior sensor and corresponds to the operation of the actuator is out of a specific frequency range, and/or when the gain of the frequency component that is obtained on the basis of the variation pattern of the output from the vehicle behavior sensor and corresponds to the operation of the actuator is out of a specific gain range.

As described above, when the abnormality involved in the motion control apparatus does not occur, the pattern (variation pattern) of the vibration noise of the output from the vehicle behavior sensor during the time that the actuator is operated with the predetermined pattern becomes a pattern having a frequency and gain corresponding to the operation of the actuator. Specifically, the frequency range (specific frequency range) corresponding to the operation of the actuator and the gain range (specific gain range) of the frequency component corresponding to the operation of the actuator can easily be set through an experiment.

The foregoing configuration is based upon this finding. With this configuration, whether the variation pattern of the output from the vehicle behavior sensor is within the normal pattern range or not can easily be determined with a simple technique.

Further, the abnormality determining means is preferably configured to correct the specific frequency range used for the next determination of abnormality on the basis of the frequency that is obtained this time based upon the variation pattern of the output from the vehicle behavior sensor and corresponds to the operation of the actuator and/or correct the specific gain range used for the next determination of abnormality on the basis of the gain of the frequency component that is obtained this time based upon the variation pattern of the output from the vehicle behavior sensor and corresponds to the operation of the actuator.

In this case, it is preferable that the center value of the specific frequency range used for the next determination of abnormality is set to be equal to the frequency that is obtained this time and corresponds to the operation of the actuator. Similarly, it is preferable that the center value of the specific gain range used for the next determination of abnormality is set to be equal to the gain of the frequency component that is obtained this time and corresponds to the operation of the actuator.

The frequency and gain in the vibration of the control unit when the actuator is operated greatly depend upon the elastic property (property in deformation amount with respect to external force, elastic coefficient) of the elastic structural member interposed between the control unit and the vehicle body. Specifically, the frequency and gain in the variation pattern of the output from the vehicle behavior sensor when the actuator is operated also greatly depend upon the elastic coefficient of the elastic structural member.

On the other hand, since the elastic member (e.g., rubber) constituting the elastic structural member is deteriorated with the lapse of time, the elastic coefficient of the elastic structural member also changes with the lapse of time. As a result, the frequency and gain in the variation pattern of the output from the vehicle behavior sensor when the actuator is operated also changes with the lapse of time.

Therefore, the foregoing configuration makes it possible to appropriately set the specific frequency range and/or specific gain range (accordingly, the normal pattern range), regardless of the lapse of time. As a result, the determination of abnormality of the motion control apparatus can appropriately be executed regardless of the lapse of time.

In this case, the abnormality determining means is preferably configured to determine that the abnormality (deterioration) of the elastic structural member occurs, when the deviation amount, from the corresponding initial value, of the frequency that is obtained on the basis of the variation pattern of the output from the vehicle behavior sensor and corresponds to the operation of the actuator and/or the deviation amount, from the corresponding initial value, of the gain of the aforesaid frequency component exceeds a reference value.

As described above, the frequency and gain in the variation pattern of the output from the vehicle behavior sensor changes in accordance with the progress of the deterioration in the elastic structural member. In other words, when the deviation amount of the frequency and gain from the initial value exceeds the reference value, it can be determined that the elastic structural member is deteriorated. The foregoing configuration is based upon this finding. With this configuration, the abnormality (deterioration) of the elastic structural member can surely be detected with a simple technique.

In the abnormality determining apparatus according to the present invention, the abnormality determining means is preferably provided with a filter (a filter for determining abnormality) that passes only the frequency band, corresponding to the operation of the actuator, of the output from the vehicle behavior sensor, and is preferably configured to use, for the output from the vehicle behavior sensor, the variation pattern of the value to which a filter process is provided by the filter for determining abnormality, instead of the variation pattern of the output from the vehicle behavior sensor.

With this configuration, the "frequency component other than the frequency band corresponding to the operation of the actuator" that is unnecessary for the determination of abnormality can be removed from the "variation pattern of the value to which the filter process is provided" used for the determination of abnormality, whereby only the "component in the frequency band corresponding to the operation of the actuator" necessary for the determination of abnormality can remain. Accordingly, this configuration prevents the misdetermination in the determination of abnormality, which is caused by the presence of the frequency component unnecessary for the determination of abnormality.

Meanwhile, when the vehicle motion control is performed on the basis of the output from the vehicle behavior sensor, a filter (basic filter (generally, a low-pass filter)) is prepared that passes only the frequency band, which should be used for the vehicle motion control, of the output from the vehicle behavior sensor, in order to prevent the malfunction of the vehicle motion control, and in most cases, the actuator is controlled based upon the value (hereinafter referred to as "sensor-output-after-basic-filter-process") to which the filter process by the basic filter is provided, with respect to the output from the vehicle behavior sensor.

In this case, the abnormality determining means can be configured to determine whether the abnormality occurs or not on the function of the basic filter on the basis of the variation pattern of the sensor-output-after-basic-filter-process during the time that the actuator is operated with the predetermined pattern.

In general, the frequency band that relates to the vehicle behavior and should be used for the vehicle motion control is sufficiently low compared to the frequency band corresponding to the operation of the actuator. In other words, the component of the frequency band corresponding to the operation of the actuator is removed by the basic filter. Accordingly, the sensor-output-after-basic-filter-process during the time that the actuator is operated with the predetermined pattern can be kept to be approximately the value (e.g., "0") corresponding to the case where the vehicle stops.

The foregoing configuration is based upon this finding. Specifically, during the time that the actuator is operated with the predetermined pattern, for example, it can be determined that the abnormality does not occur on the function of the basic filter when the sensor-output-after-basic-filter-process is kept to be approximately the value corresponding to the still state of the vehicle, and it can be determined that the abnormality occurs on the function of the basic filter when the sensor-output-after-basic-filter-process is not kept to be approximately the value corresponding to the still state of the vehicle.

In this case, the control means is preferably configured to correct the frequency band that should be used for the vehicle motion control with the basic filter on the basis of the variation pattern of the output from the vehicle behavior sensor obtained by the abnormality determining means.

With this configuration, for example, the resonance frequency of the control unit can be obtained on the basis of the variation pattern of the output from the vehicle behavior sensor obtained by the abnormality determining means, and the frequency band that should be used for the vehicle motion control can be corrected such that the obtained resonance frequency does not belong to the frequency band. Accordingly, this configuration surely makes it possible to prevent the occurrence of the malfunction in the vehicle motion control that is caused by the generation of the resonance of the control unit during the running of the vehicle.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
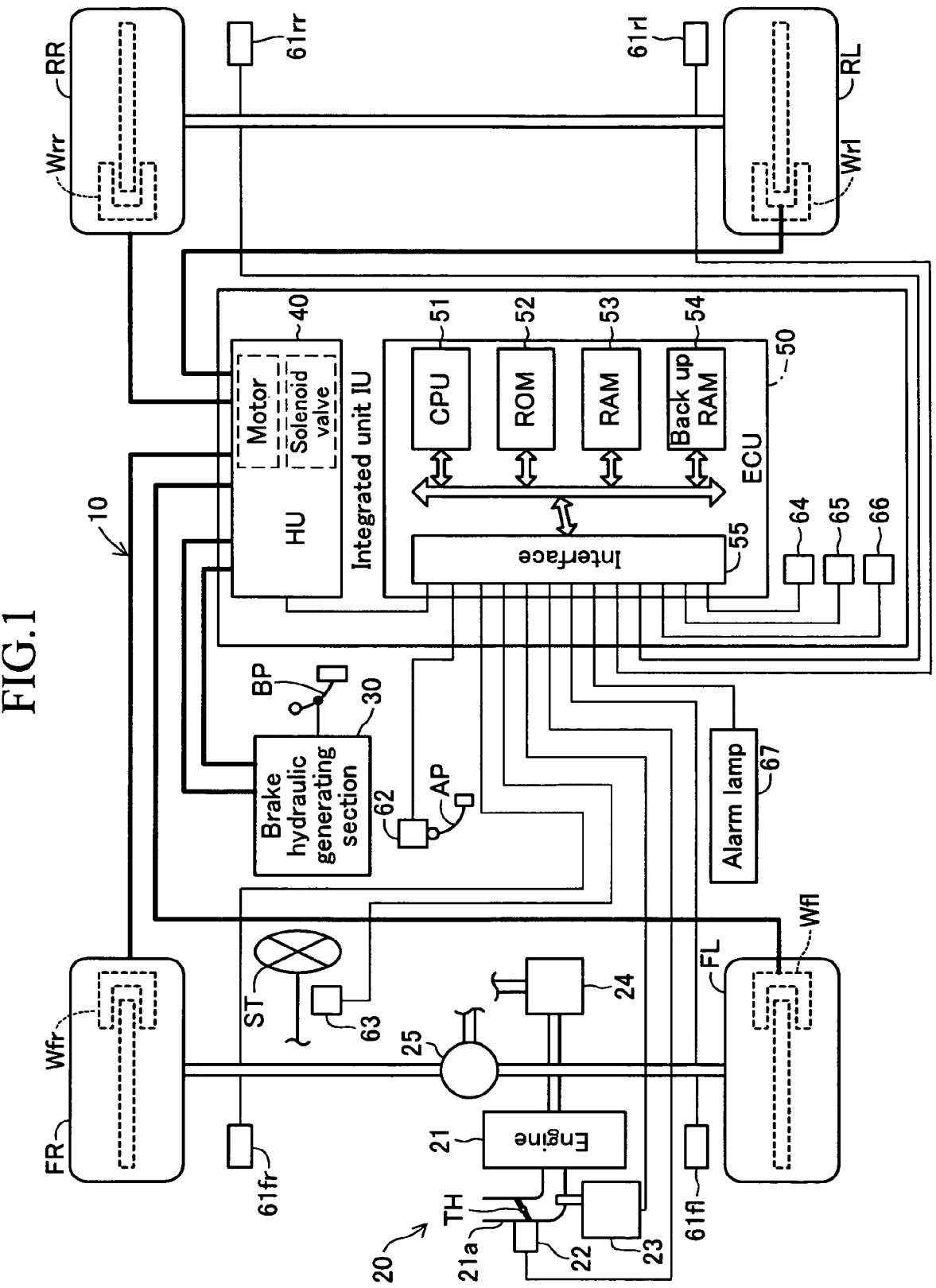
FIG. 1 is a schematic structural diagram of a vehicle equipped with an abnormality determining apparatus (vehicle motion control apparatus) of a motion control apparatus according to an embodiment of the present invention.

Below, an embodiment of a vehicle motion control apparatus including a vehicle abnormality determining apparatus according to the present invention will be described while referring to the drawings. FIG. 1 schematically illustrates a vehicle on which a motion control apparatus 10 according to the embodiment of the present invention is mounted. The illustrated vehicle is a front-wheel-drive vehicle.

The motion control apparatus 10 has a drive force transmission mechanism section 20 which generates a drive force and transmits it to drive wheels FL and FR; a brake hydraulic pressure generating section 30 for generating a brake hydraulic pressure in each wheel corresponding to a brake operation by a driver; an integrated unit IU integrally composed of a control unit 40 (hydraulic unit, hereinafter simply referred to as "HU 40") and an electronic control apparatus 50 (hereinafter simply referred to as "ECU 50").

Figure 2:
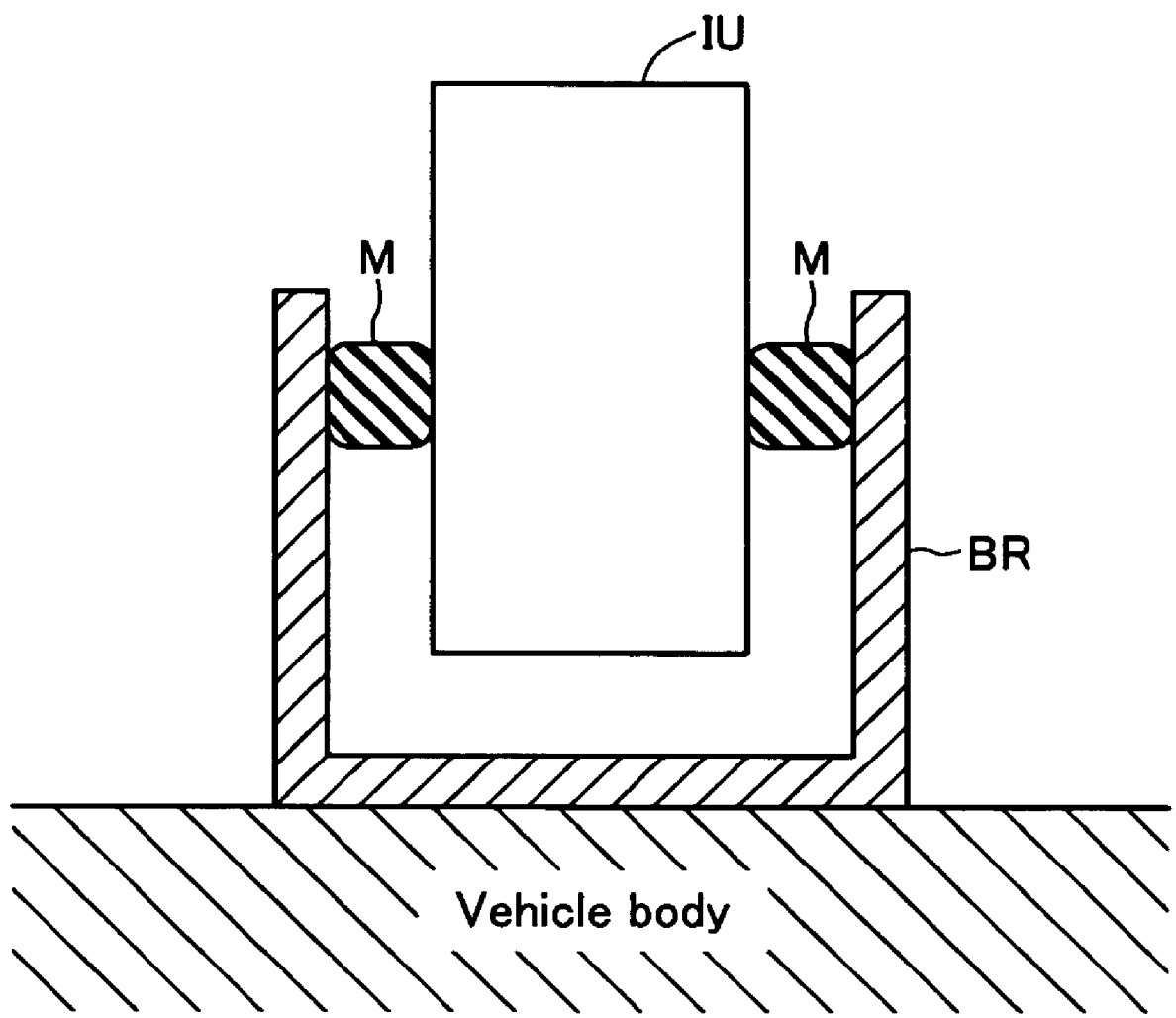
FIG. 2 is a schematic diagram showing the state in which the integrated unit shown in FIG. 1 is fixed to a vehicle body via an elastic structural member composed of a bracket and mount.

As schematically shown in FIG. 2, the integrated unit IU is fixed to the vehicle body through a bracket BR made of an elastic member (e.g., metal, or the like) and mounts M made of an elastic member (e.g., rubber, or the like). In other words, the integrated unit IU is fixed to the vehicle body via an elastic structural member made of the bracket BR and mounts MT.

Referring again to FIG. 1, the drive force transmission mechanism section 20 comprises an engine 21 which generates a drive force; a throttle valve actuator 22 which is disposed in an intake pipe 21a of the engine 21 and controls the opening of a throttle valve TH and which varies the open cross-sectional area of the intake passage; and a fuel injection apparatus 23 which includes fuel injectors which spray fuel in the vicinity of unillustrated intake ports of the engine 21.

The drive force transmission mechanism section 20 also comprises a transmission 24 whose input shaft is connected to the output shaft of the engine 21; and a front-wheel-side differential 25 that is connected to the output shaft of the transmission 24 and properly distributes and transmits the drive force from the engine 21 to the front wheels FL and FR.

Figure 3:
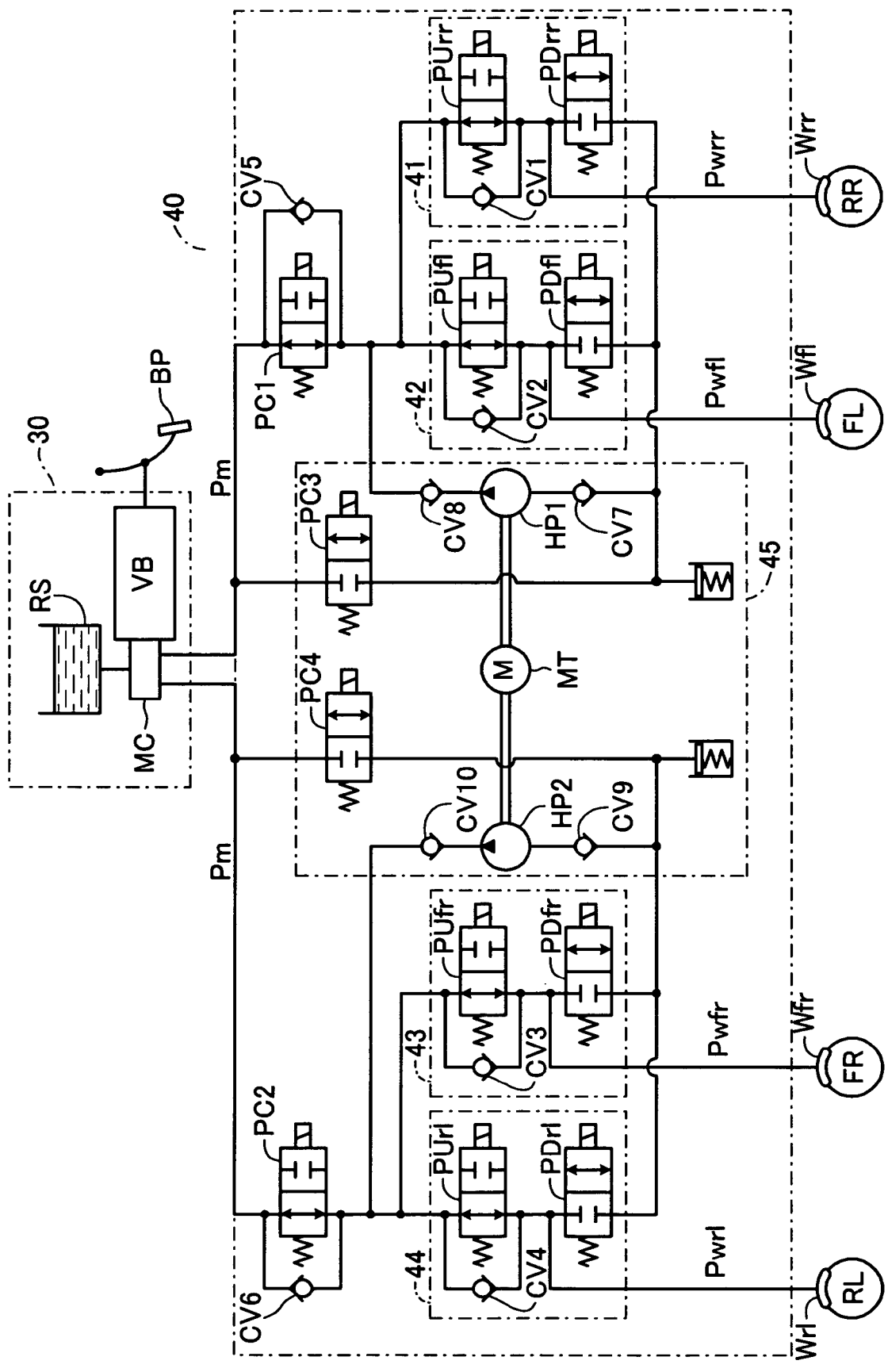
FIG. 3 is a schematic structural diagram of the brake hydraulic pressure generating section and hydraulic unit shown in FIG. 1.

As schematically shown in FIG. 3, the brake hydraulic pressure generating section 30 includes a vacuum booster VB that operates in response to operation of the brake pedal BP, and a master cylinder MC which is linked to the vacuum booster VB. The vacuum booster VB utilizes the air pressure (negative pressure) in the intake pipe of the engine 21 so as to boost the operating force of the brake pedal BP by a prescribed ratio and transmits the boosted operating force to the master cylinder MC.

The master cylinder MC has two output ports; i.e., a first port and a second port. The master cylinder MC receives brake fluid from a reservoir RS, and generates from the first port a first master cylinder hydraulic pressure Pm corresponding to the boosted operating force. The master cylinder MC also generates from the second port a second master cylinder hydraulic pressure Pm which is substantially the same as the first master cylinder hydraulic pressure Pm and which corresponds to the boosted operating force.

The structures and operations of the master cylinder MC and the vacuum booster VB are well known, and therefore an explanation of the details thereof will be omitted. In this manner, the master cylinder MC and the vacuum booster VB generate first master cylinder hydraulic pressure Pm and second master cylinder hydraulic pressure Pm corresponding to the operating force of the brake pedal BP.

As schematically shown in FIG. 3, the HU 40 includes RR brake hydraulic pressure adjusting section 41, FL brake hydraulic pressure adjusting section 42, FR brake hydraulic pressure adjusting section 43 and RL brake hydraulic pressure adjusting section 44, each of which can adjust brake hydraulic pressure supplied to each of wheel cylinders Wrr, Wfl, Wfr, and Wrl arranged at each of wheels RR, FL, FR, and RL, and return brake fluid supplying section 45.

The first port of the master cylinder MC belongs to the section relating to the wheels RR and FL, and a normally open solenoid valve PC1 is disposed between the first port and the upstream side of the RR brake hydraulic pressure adjusting section 41 and the FL brake hydraulic pressure adjusting section 42. Similarly, the second port of the master cylinder MC belongs to the section relating to the wheels FR and RL, and a normally open solenoid valve PC2 is disposed between the second port and the upstream side of the FR brake hydraulic pressure adjusting section 43 and the RL brake hydraulic pressure adjusting section 44.

The RR brake hydraulic pressure adjusting section 41 consists of a pressure-increasing valve PUrr, which is a normally-open solenoid on-off valve of a 2-port, 2-position type, and a pressure-reducing valve PDrr, which is a normally-closed solenoid on-off valve of a 2-port, 2-position type. The pressure-increasing valve PUrr can establish or break the communication between the upstream side of the RR brake hydraulic pressure adjusting section 41 and the wheel cylinder Wrr. The pressure-reducing valve PDrr can establish or break the communication between the wheel cylinder Wrr and the reservoir RS1. As a result, the brake fluid pressure in the wheel cylinder Wrr (wheel cylinder pressure Pwrr) can be increased, held, or reduced through the control of the pressure-increasing valve PUrr and the pressure-reducing valve PDrr.

A check valve CV1 which allows flow of the brake fluid in only one direction from the wheel cylinder Wrr side to the upstream side of the RR brake hydraulic pressure adjusting section 41 is connected in parallel with the pressure-increasing valve PUrr. As a result, when the brake pedal BP is released after being operated, the wheel cylinder pressure Pwrr is rapidly decreased.

Similarly, the FL brake hydraulic pressure adjusting section 42, the FR brake hydraulic pressure adjusting section 43, and the RL brake hydraulic pressure adjusting section 44 comprise a pressure-increasing valve PUfl and a pressure-reducing valve PDfl, a pressure-increasing valve PUfr and a pressure-reducing valve PDfr, and a pressure-increasing valve PUrl and a pressure-reducing valve PDrl, respectively. By controlling each pressure-increasing valve and pressure-reducing valve, the brake hydraulic pressure in the wheel cylinder Wfl, the wheel cylinder Wfr, and the wheel cylinder Wrl (wheel cylinder pressure Pwfl, Pwfr, Pwrl) can be increased, held, or decreased. Check valves CV2, CV3, and CV4 are provided in parallel with the pressure-increasing valves PUfl, PUfr, and PUrl, respectively, to provide the same function as that of the check valve CV1.

Additionally, a check valve CV5 which allows flow of the brake fluid in only one direction from the first port of the master cylinder MC to the upstream side of the RR brake hydraulic pressure adjusting section 41 and the upstream side of the FL brake hydraulic pressure adjusting section 42 is connected in parallel with the normally-open solenoid on-off valve PC1. Accordingly, when the first master cylinder hydraulic pressure Pm becomes higher than the pressures at the upstream side of the RR brake hydraulic pressure adjusting section 41 and at the upstream side of the FL brake hydraulic pressure adjusting section 42 due to the operation of the brake pedal BP even when the normally-open solenoid on-off valve PC1 is in its closed state, the brake hydraulic pressure (i.e., first master cylinder pressure Pm) corresponding to the operating force of the brake pedal BP can be supplied to the wheel cylinders Wrr and Wfl. Further, a check valve CV6 is also disposed in parallel with the normally-open solenoid on-off valve PC2 to provide the same function as that of the check valve CV5.

The return brake fluid supply section 45 includes a DC motor MT, and two hydraulic pumps (gear pumps) HP1 and HP2 simultaneously driven by the motor MT, and normally-closed solenoid on-off valves PC3 and PC4. The normally-closed solenoid on-off valve PC3 is disposed between the first port of the master cylinder MC and the reservoir RS1, while the normally-closed solenoid on-off valve PC4 is disposed between the second port of the master cylinder MC and the reservoir RS2.

The hydraulic pump HP1 pumps, via a check valve CV7, the brake fluid returned from the pressure-reducing valves PDrr and PDfl to the reservoir RS1, or the brake fluid from the first port of the master cylinder MC in the case of the normally-closed solenoid on-off valve PC3 being in its open state, and supplies the pumped brake fluid to the upstream sides of the RR brake hydraulic pressure adjusting section 41 and the FL brake hydraulic pressure adjusting section 42 via a check valve CV8.

Similarly, the hydraulic pump HP2 pumps, via a check valve CV9, the brake fluid returned from the pressure-reducing valves PDfr and PDrl to the reservoir RS2, or the brake fluid from the second port of the master cylinder MC in the case of the normally-closed solenoid on-off valve PC4 being in its open state, and supplies the pumped brake fluid to the upstream sides of the FR brake hydraulic pressure adjusting section 43 and the RL brake hydraulic pressure adjusting section 44 via a check valve CV10.

In the above-explained structure, the HU 40 has connected thereto two pipes that are connected to the first and second ports of the master cylinder MC and four pipes that are connected to the wheel cylinders W (i.e., six pipes in total). The HU 40 consists of two hydraulic circuits, one of which relates to the rear-right wheel RR and front-left wheel FL, and the other of which relates to the rear-left wheel RL and front-right wheel FR. The HU 40 can supply the brake hydraulic pressure (i.e., master cylinder pressure Pm) corresponding to the operating force of the brake pedal BP to the wheel cylinders W respectively when all the solenoid valves are in their non-excited states.

In the following description, the symbol "" appended to various variables and the like collectively represents the symbols fl, fr, rl, and rr and indicates that the particular variable or the like applies to all of the wheels FR, FL, etc. of the vehicle. For example, the wheel cylinder W collectively indicates the wheel cylinder Wfl for the front-left wheel, the wheel cylinder Wfr for the front-right wheel, the wheel cylinder Wrl for the rear-left wheel, and the wheel cylinder Wrr for the rear-right wheel.

On the other hand, when the normally-open solenoid on-off valves PC1 and PC2 are energized to be in their closed states, normally-closed solenoid on-off valves PC3 and PC4 are energized to be in their open states, and the motor MT (accordingly, hydraulic pumps HP1 and HP2) is driven, the HU 40 can supply brake hydraulic pressure higher than the master cylinder pressure Pm to the wheel cylinders W** respectively.

Additionally, the HU 40 can independently adjust the wheel cylinder pressures Pw through the control of the pressure-increasing valves PU and pressure-reducing valves PD. Specifically, the HU 40** can independently adjust the braking force applied to each wheel, regardless of the operation of the brake pedal BP by a driver.

Referring back to FIG. 1, the ECU 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which stores data when the power supply is on and which maintains the stored data when the power supply is cut off; an interface 55 containing A/D converters; and the like. The above components are interconnected via a bus.

The interface 55 is connected to a vehicle speed sensors 61\*\*, accelerator opening sensor 62 and steering angle sensor 63, those of which are separate from the integrated unit IU, via predetermined harnesses, connectors and the like, so as to be capable of performing CAN communication. Further, the interface 55 is electrically connected directly with a yaw rate sensor 64, longitudinal acceleration sensor 65, and lateral acceleration sensor 66, those of which are incorporated in the integrated unit IU, without using harnesses or connectors. Further, the interface 55 is connected to an alarm lamp 67.

Here, the yaw rate sensor 64, longitudinal acceleration sensor 65, and lateral acceleration sensor 66 correspond to vehicle behavior sensor. Specifically, six sensors, which are yaw rate sensor, roll rate sensor, pitch rate sensor, longitudinal acceleration sensor, lateral acceleration sensor, and normal acceleration sensor, are generally regarded as the vehicle behavior sensor. In this embodiment, the yaw rate sensor 64, longitudinal acceleration sensor 65, and lateral acceleration sensor 66 are employed as the representatives of six sensors.

The yaw rate sensor 64 detects a yaw rate of a vehicle, and outputs a signal indicating a yaw rate analog value Yr. The longitudinal acceleration sensor 65 detects acceleration in the longitudinal direction of a vehicle body, and outputs a signal indicating a longitudinal acceleration analog value Gx. The lateral acceleration sensor 66 detects acceleration in the lateral direction of the vehicle body, and outputs a signal indicating a lateral acceleration analog value Gy.

The interface 55 supplies each of digital signals, which are obtained by providing AD conversion to each analog signal from the sensors 61 to 66 at the AD converter, to the CPU 51. Further, in accordance with instructions from the CPU 51, the interface 55 outputs drive signals to the respective solenoid valves and the motor of the HU 40, the throttle valve actuator 22, and the fuel injection apparatus 23, or transmits a lighting signal to the alarm lamp 67.

By virtue of the above-described configuration, the HU 40 can achieve a known vehicle stabilization control (specifically, understeer/oversteer suppression control, hereinafter sometimes referred to as "OS-US suppression control") in response to the instruction from the ECU 50 based upon the outputs from the sensors 61 to 66.

Specifically, when the ECU 50 determines that the vehicle is in the "understeer state" or "oversteer state", it controls the HU 40 to apply prescribed brake hydraulic pressure to a prescribed wheel. In addition, the ECU 50 executes the engine-output lowering control which lowers a predetermined amount the output of the engine 21 (specifically, the throttle valve opening) from a level corresponding to the accelerator pedal operation amount Accp. As a result, the vehicle attitude can be controlled, whereby the turning-trace performance of the vehicle or turning stability can be maintained. The OS-US suppression control is well known, and hence, the detailed explanation thereof is omitted here.

Elimination of Vibration Noise Superimposing on Output from Vehicle Behavior Sensor by Basic Soft Filter As described above, the integrated unit IU is fixed to the vehicle body via the elastic structural member made of the bracket BR and mount M. Accordingly, when the vehicle body vibrates, due to the input or the like from the road surface, with a frequency near the resonance frequency of the integrated unit IU to the vehicle body, the vibration at the vehicle body is amplified by the resonance and can be transmitted to the integrated unit IU. Further, vibration is also produced on the integrated unit IU because of the operations of the motor MT (hydraulic pumps HP1, HP2), and plural solenoid valves (i.e., actuators) mounted thereto.

Therefore, various vibrations received by the integrated unit IU can also be transmitted to the vehicle behavior sensors 64, 65 and 66 incorporated in the integrated unit IU, resulting in that the vibration noise is superimposed on each of the analog signals indicating the yaw rate analog value Yr, longitudinal acceleration analog value Gx, and lateral acceleration analog value Gy, that are output signals from the vehicle behavior sensors 64, 65 and 66.

Performing the OS-US suppression control on the basis of the output signals from the vehicle behavior sensors 64, 65 and 66 on which the vibration noise is superimposed possibly entails a malfunction of the OS-US suppression control, thus unpreferable.

Figure 4:
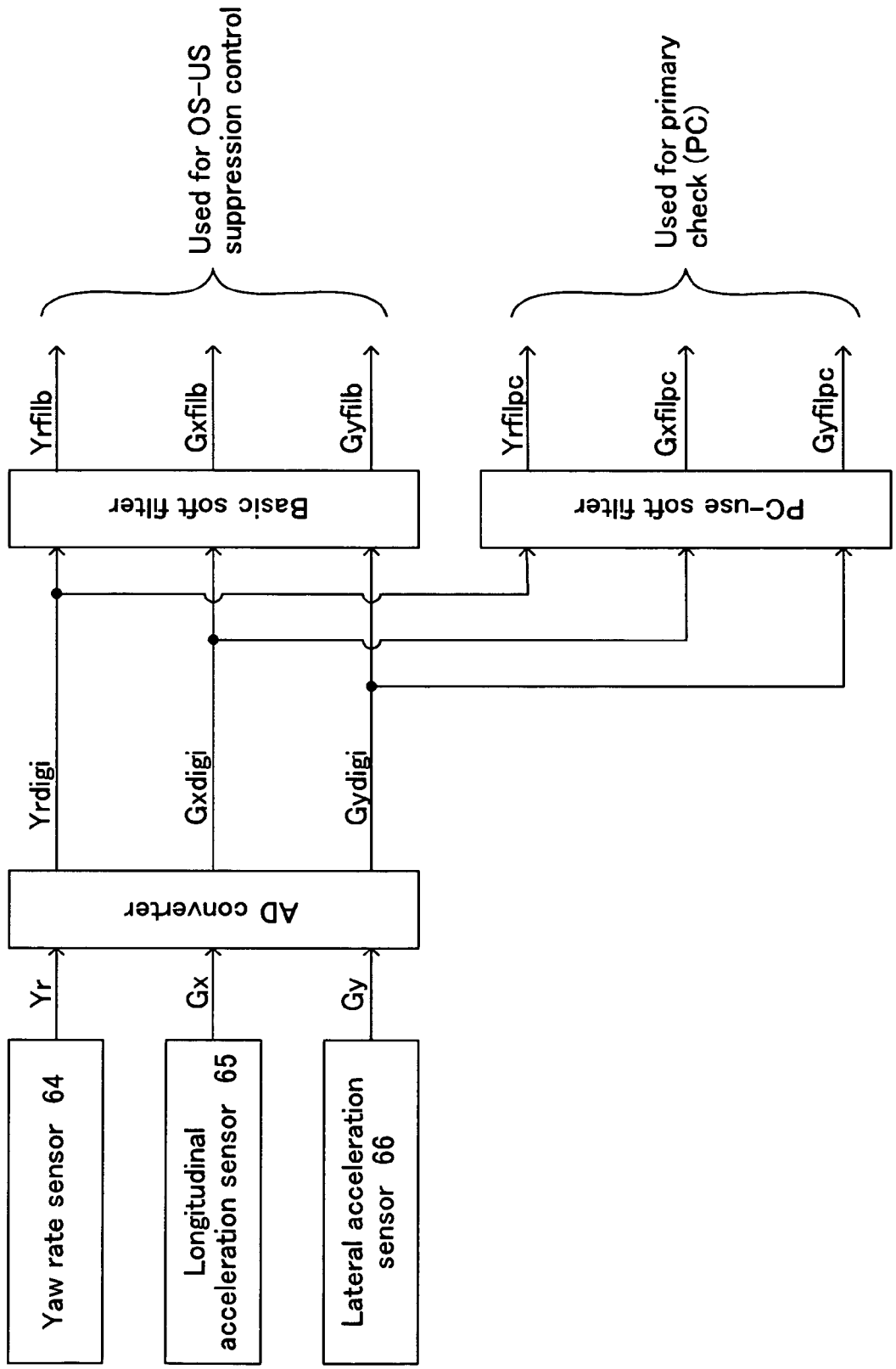
FIG. 4 is a diagram showing a flow of a filter process to output signals from vehicle behavior sensors.

In view of this, the vehicle motion control apparatus 10 (hereinafter referred to as "present apparatus") including the abnormality determining apparatus for the vehicle motion control apparatus according to the present invention provides a low-pass filter process to the output signals in order to eliminate the vibration noise superimposed on the output signals from the vehicle behavior sensors 64, 65 and 66. FIG. 4 shows a flow of the filter process for the output signals from the vehicle behavior sensors 64, 65 and 66 by the present apparatus.

As shown in FIG. 4, the output signals from the vehicle behavior sensors 64, 65 and 66, i.e., the analog signals indicating the yaw rate analog value Yr, longitudinal acceleration analog value Gx, and lateral acceleration analog value Gy, are respectively inputted to the AD converter incorporated in the interface 55. The AD converter samples these analog signals with a prescribed sampling time, and outputs the digital signals indicating the yaw rate digital value Yrdigi, longitudinal acceleration digital value Gxdigi, and lateral acceleration digital value Gydigi.

The digital signals indicating the yaw rate digital value Yrdigi, longitudinal acceleration digital value Gxdigi, and lateral acceleration digital value Gydigi are respectively inputted to a basic soft filter. The basic soft filter provides a filter process to these digital signals, and outputs a yaw-rate-after-basic-filter-process Yrfilb, longitudinal-acceleration-after-basic-filter-process Gxfilb, and lateral-acceleration-after-basic-filter-process Gyfilb respectively.

Figure 5:
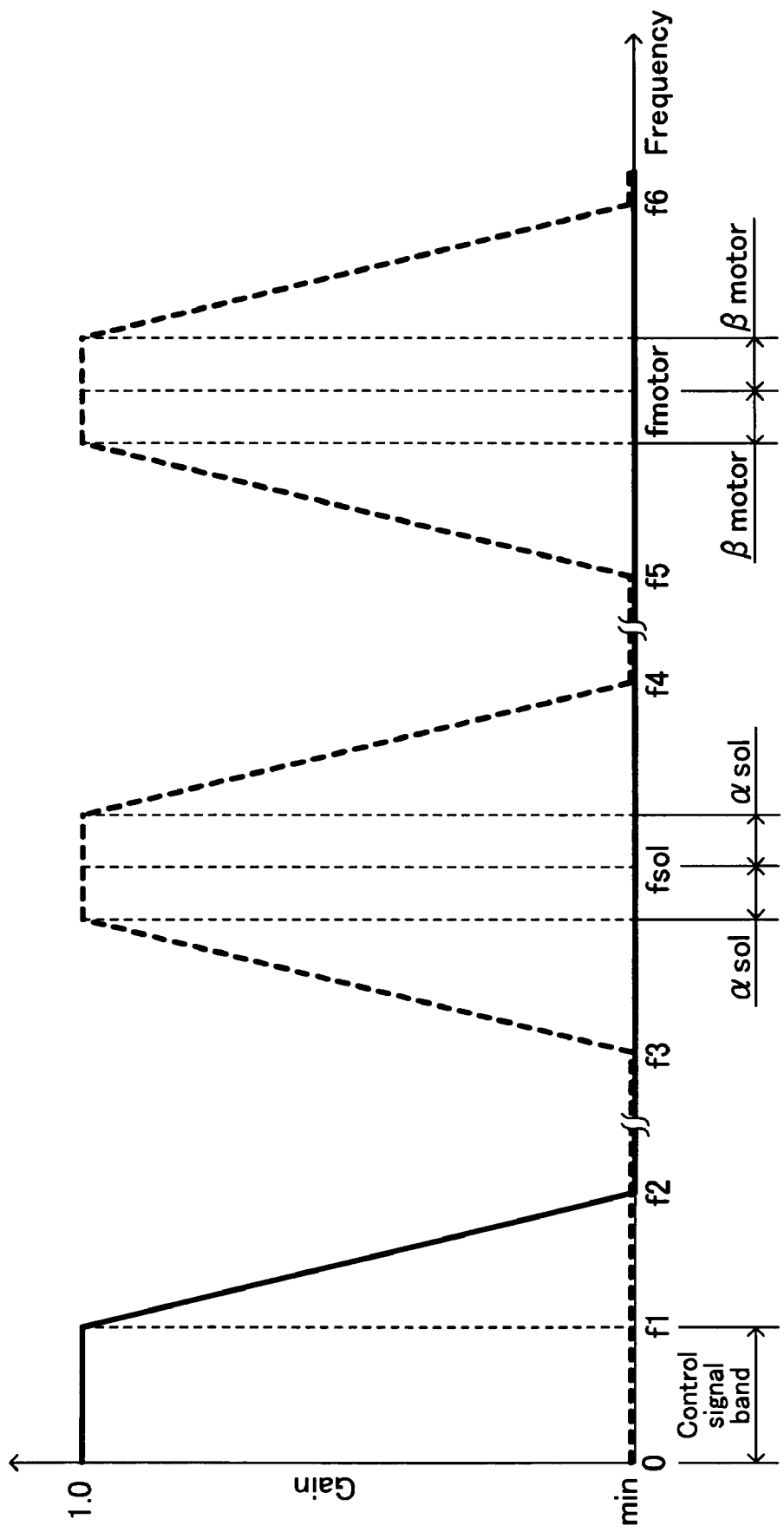
FIG. 5 is a diagram showing a frequency—gain characteristic for a basic soft filter and a soft filter for a primary check.

The basic soft filter is composed of a program stored in the ROM 52 of the ECU 50. The solid line in FIG. 5 shows a frequency-gain characteristic of the basic soft filter. The basic soft filter is a low-pass filter, and its cut-off frequency is set to the upper limit value f1 (e.g., 10 Hz) of the frequency band (control signal band) that should be used for the vehicle motion control (braking force control, OS-US suppression control).

The basic soft filter has a characteristic such that the gain is "min" at the frequency band of the value f2 or more (>f1, e.g., 20 Hz). The "min" means that the gain is not "0" but is small enough not to affect at all the vehicle motion control (the same is true for the following explanation).

With this configuration, in the digital signals outputted from the basic soft filter and indicating the yaw-rate-after-basic-filter-process Yrfilb, longitudinal-acceleration-after-basic-filter-process Gxfilb, and lateral-acceleration-after-basic-filter-process Gyfilb, the gain of the component in the control signal band (component whose frequency is not more than f1) is secured with no alteration, and the component of the vibration noise in the frequency band of not less than f2 is "eliminated".

The present apparatus employs the digital signals (digital signals indicating Yrfilb, Gxfilb, Gyfilb) from which the component of the vibration noise in the frequency band of not less than f2 is eliminated for the aforesaid OS-US suppression control. Accordingly, the OS-US suppression control can appropriately be executed on the basis of the outputs from the vehicle behavior sensors after the vibration noise is effectively eliminated.

Outline of Primary Check

Subsequently, the outline of the primary check according to the present apparatus will be explained. When a prescribed short time has been elapsed after the unillustrated ignition switch (hereinafter referred to as "IG") is changed to its ON state from its OFF state (when the primary check start condition is established), the present apparatus immediately starts and executes the primary check for the HU 40.

Figure 6:
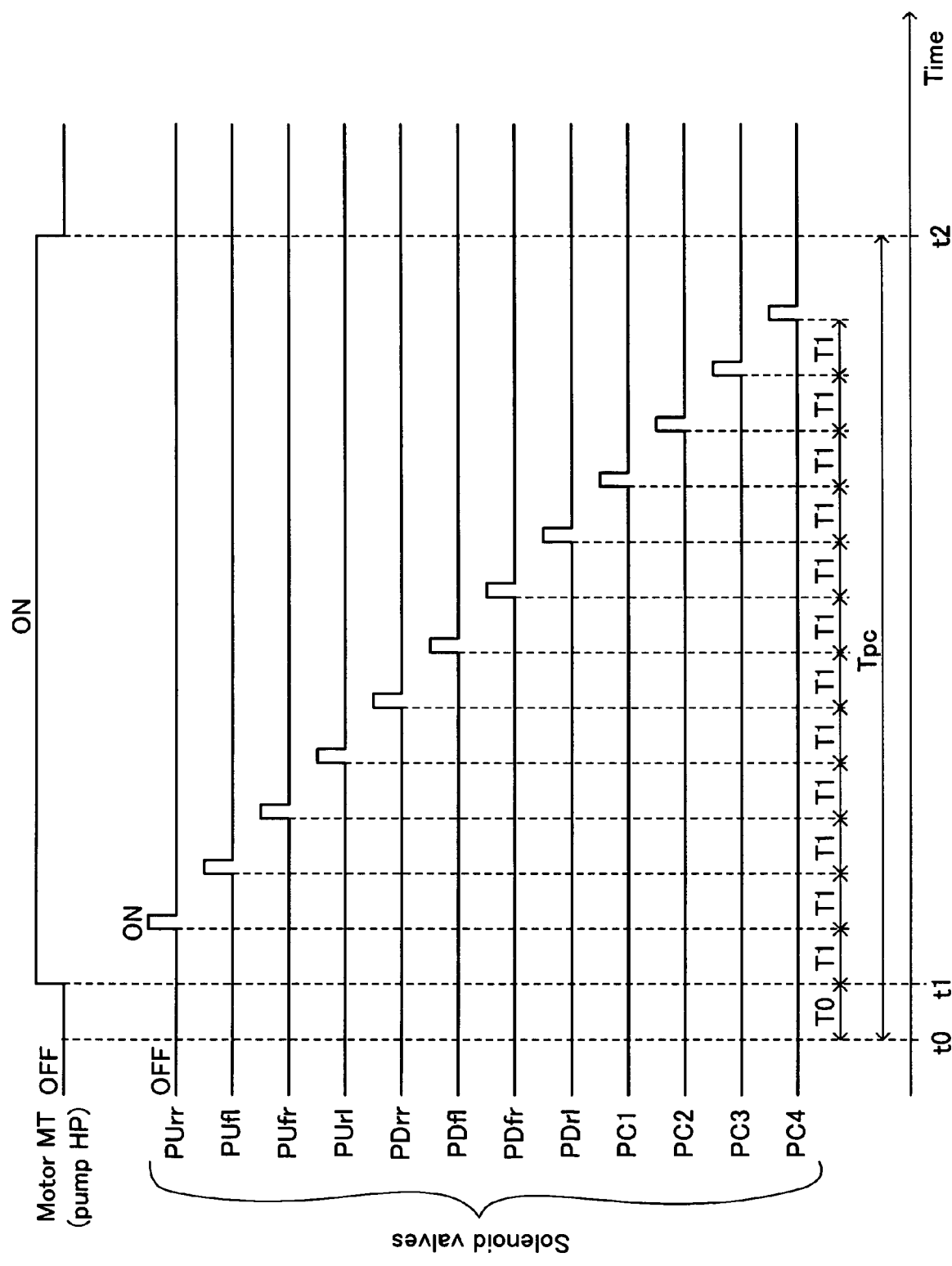
FIG. 6 is a time chart showing a drive-signal generating pattern of each actuator in the hydraulic unit during the primary check.

FIG. 6 is a time chart indicating a pattern of generating a drive signal of each actuator in the primary check. The present apparatus generates the drive signal (ON signal) for driving the motor MT (hydraulic pumps HP1 and HP2) and twelve solenoid valves mounted to the HU 40 with the pattern shown in FIG. 6 after a time t0 when the primary check start condition for the HU 40 is established.

Thus, the present apparatus determines whether abnormality such as disconnection, short-circuit, or the like occurs or not in the unillustrated drive circuit incorporated in the electronic control apparatus 50 for driving these actuators. The detail of the primary check is well known, so that its detailed explanation is omitted here.

Detection of Abnormality Regarding HU 40 by Utilizing Primary Check

When the primary check is executed in case where the abnormality involved in the integrated unit IU does not occur (including the case where the abnormality does not occur in the drive circuit), each actuator mounted to the HU 40 is actually activated with the generation pattern of the drive signal (ON signal) shown in FIG. 6.

Therefore, vibration noise is superimposed on each of the analog signals that are the output signals from the vehicle behavior sensors 64, 65 and 66 and indicates the yaw rate analog value Yr, longitudinal acceleration analog value Gx, and lateral acceleration analog value Gy, with the result that the vibration noise is also superimposed on the yaw rate digital value Yrdigi, longitudinal acceleration digital value Gxdigi, and lateral acceleration digital value Gydigi. The patterns of the vibration noise superimposed on these digital values are similar to one another. Therefore, only the yaw rate digital value Yrdigi will be explained as the representative example of these digital values.

Figure 7:
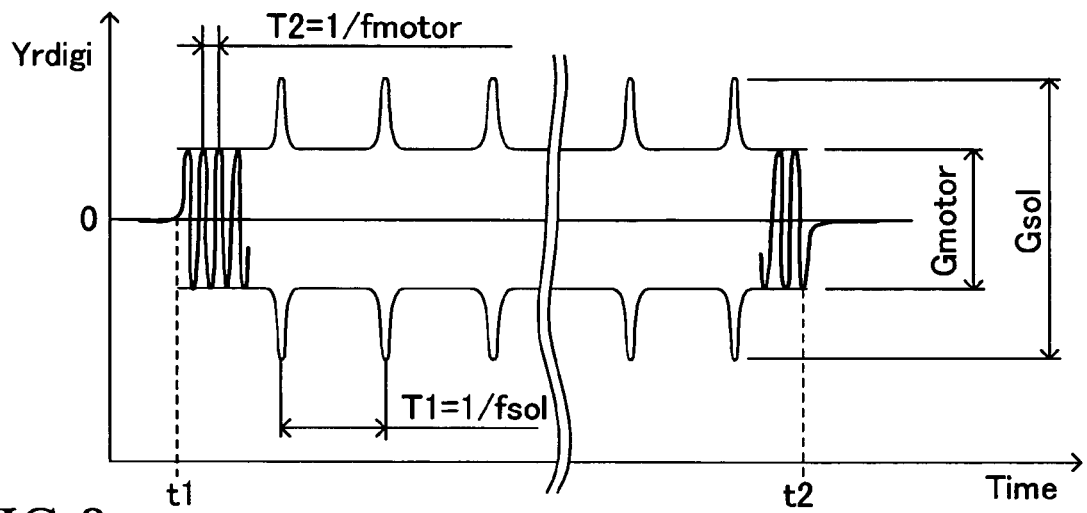
FIG. 7 is a time chart showing a pattern of a vibration noise of a yaw rate digital value generated by the operation of each actuator with the primary check.

FIG. 7 is a time chart showing the pattern (variation pattern) of the vibration noise, which is generated due to the operation of each actuator by the primary check, of the yaw rate digital value Ydrigi, when the abnormality involved in the integrated unit IU does not occur. Times t1 and t2 and cycle T1 respectively correspond to the times t1 and t2 and the cycle T1 in FIG. 6.

In FIG. 7, the vibration component of the gain (amplitude) Gsol in the cycle T1 (frequency fsol, e.g., 100 Hz) is generated corresponding to the successive operations of the twelve solenoid valves in the cycle T1 as shown in FIG. 6. The vibration component of the gain (amplitude) Gmotor in the cycle T2 (frequency fmotor, e.g., 1 kHz) is generated corresponding to the continuous operation of the motor MT (hydraulic pumps HP1 and HP2) during the period from the time t1 to the time t2.

When the primary check is executed in case where the abnormality involved in the integrated unit IU does not occur as described above, the vibration noise including the vibration component of the gain Gsol with the frequency fsol and the vibration component of the gain Gmotor with the frequency fmotor is generated in the yaw rate digital value Yrdigi (the same is true for Gxdigi, and Gydigi).

In other words, in the case of executing the primary check, when it can be determined that the above-mentioned two types of vibration components are generated in the outputs from the vehicle behavior sensors 64, 65 and 66 (i.e., the vibration waveform is normal), it can be determined that the abnormality involved in the integrated unit IU does not occur, while when it can be determined that the above-mentioned two types of vibration components are not generated (i.e., the vibration waveform is abnormal), it can be determined that the abnormality involved in the integrated unit IU occurs.

The present apparatus determines whether the abnormality involved in the integrated unit IU occurs or not by utilizing this principle. The detail of the abnormality determination will be explained in detail with reference to flowcharts.

Figure 8:
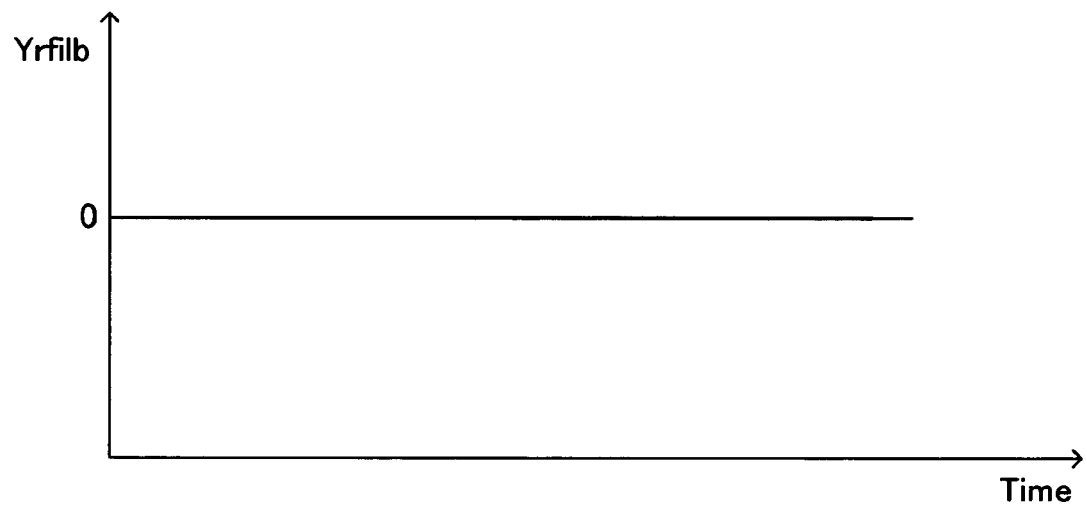
FIG. 8 is a time chart showing a pattern of a vibration noise of a yaw-rate-after-basic-filter-process during the operation of each actuator with the primary check.

Meanwhile, since the frequencies fsol and fmotor of the above-mentioned two types of vibration components are sufficiently great as shown in FIG. 5, they are "eliminated" by the basic soft filter. Therefore, the value of the yaw-rate-after-basic-filter-process Yrfilb (see FIG. 4) during the execution of the primary check is kept to be approximately "0" as shown in FIG. 8 (the same is true for Gxfilb, and Gyfilb). Accordingly, it is impossible to determine the abnormality involved in the integrated unit IU by utilizing the yaw-rate-after-basic-filter-process Yrfilb, longitudinal-acceleration-after-basic-filter-process Gxfilb, and lateral-acceleration-after-basic-filter-process Gyfilb.

On the other hand, vibration components other than the aforesaid two types of vibration components may possibly be mixed in the yaw rate digital value Yrdigi, longitudinal acceleration digital value Gxdigi, and lateral acceleration digital value Gydigi themselves. Therefore, when the abnormality involved in the integrated unit IU is determined (i.e., the vibration waveform is determined to be normal or not) by utilizing these values, misdetermination may possibly be done.

In view of this, the present apparatus has a PC-use soft filter that is a band-pass filter for passing only the aforesaid two types of vibration components, besides the basic soft filter, as shown in FIG. 4. The PC-use soft filter inputs the digital signals indicating the yaw rate digital value Yrdigi, longitudinal acceleration digital value Gxdigi, and lateral acceleration digital value Gydigi, provides the filter process to these digital signals, and outputs digital signals indicating yaw-rate-after-PC-filter-process Yrfilpc, longitudinal-acceleration-after-PC-filter-process Gxfilpc, and lateral-acceleration-after-PC-filter-process Gyfilpc.

The PC-use soft filter is also composed of the program stored in the ROM 52 of the ECU 50, like the basic soft filter. The broken line shown in FIG. 5 indicates the frequency—gain characteristic of the PC-use soft filter. As described above, the PC-use soft filter is a band-pass filter, and it has a characteristic such that the gain becomes "1" in the frequency band within fsol±αsol and the frequency band within fmotor±αmotor, and gain becomes "min" in the frequency band of not more than a value f3 (f2<f3<fsol) and not less than a value f4 (>fsol) and in the frequency band of not more than a value f5 (f4<f5<fmotor) and not less than a value f6 (>fmotor).

Figure 9:
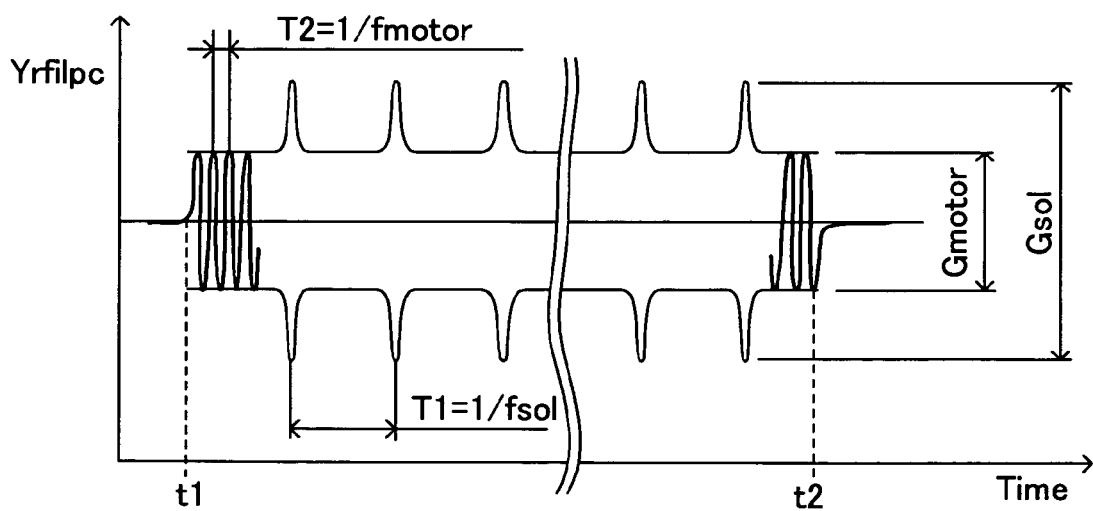
FIG. 9 is a time chart showing a pattern of a vibration noise of a yaw-rate-after-PC-filter-process during the operation of each actuator with the primary check.

With this configuration, in the digital signals outputted from the PC-use soft filter and indicating the yaw-rate-after-PC-filter-process Yrfilpc, longitudinal-acceleration-after-PC-filter-process Gxfilpc, and lateral-acceleration-after-PC-filter-process Gyfilpc, the gain of the aforesaid two types of vibration components (specifically, the components in the frequency band within the range of fsol±αsol and the range of fmotor±αmotor) is secured with no alteration, and the component of the vibration noise in the frequency band of not more than f3, within the range of f4 to f5, and not less than f6 is "eliminated". Consequently, only the aforesaid two types of vibration components are included in the yaw-rate-after-PC-filter-process Yrfilpc during the execution of the primary check as shown in FIG. 9 (the same is true for Gxfilpc, and Gyfilpc).

The present apparatus employs the digital signals (digital signals indicating Yrfilpc, Gxfilpc, and Gyfilpc) from which components of the vibration noise other than the aforesaid two types of vibration components are "eliminated" for the abnormality determination for the integrated unit IU. Thus, the misdetermination caused by the presence of the components of vibration noise other than the aforesaid two types of vibration components can be prevented in the abnormality determination for the integrated unit IU (i.e., determination as to whether the vibration waveform is normal or not). It is to be noted that the present apparatus executes the filter process by the PC-use soft filter only during the execution of the primary check.

Actual Operation

The abnormality determination involved in the integrated unit IU according to the present apparatus will be explained while referring to FIGS. 10 and 12, which show, in the form of flowcharts, routines which are executed by the CPU 51 of the ECU 50. As for the symbol "(k)" appended to various variables, "k=1" means the value relating to the yaw rate sensor 64, "k=2" means the value relating to the longitudinal acceleration sensor 65, and "k=3" means the value relating to the lateral acceleration sensor 66.

Figure 10:
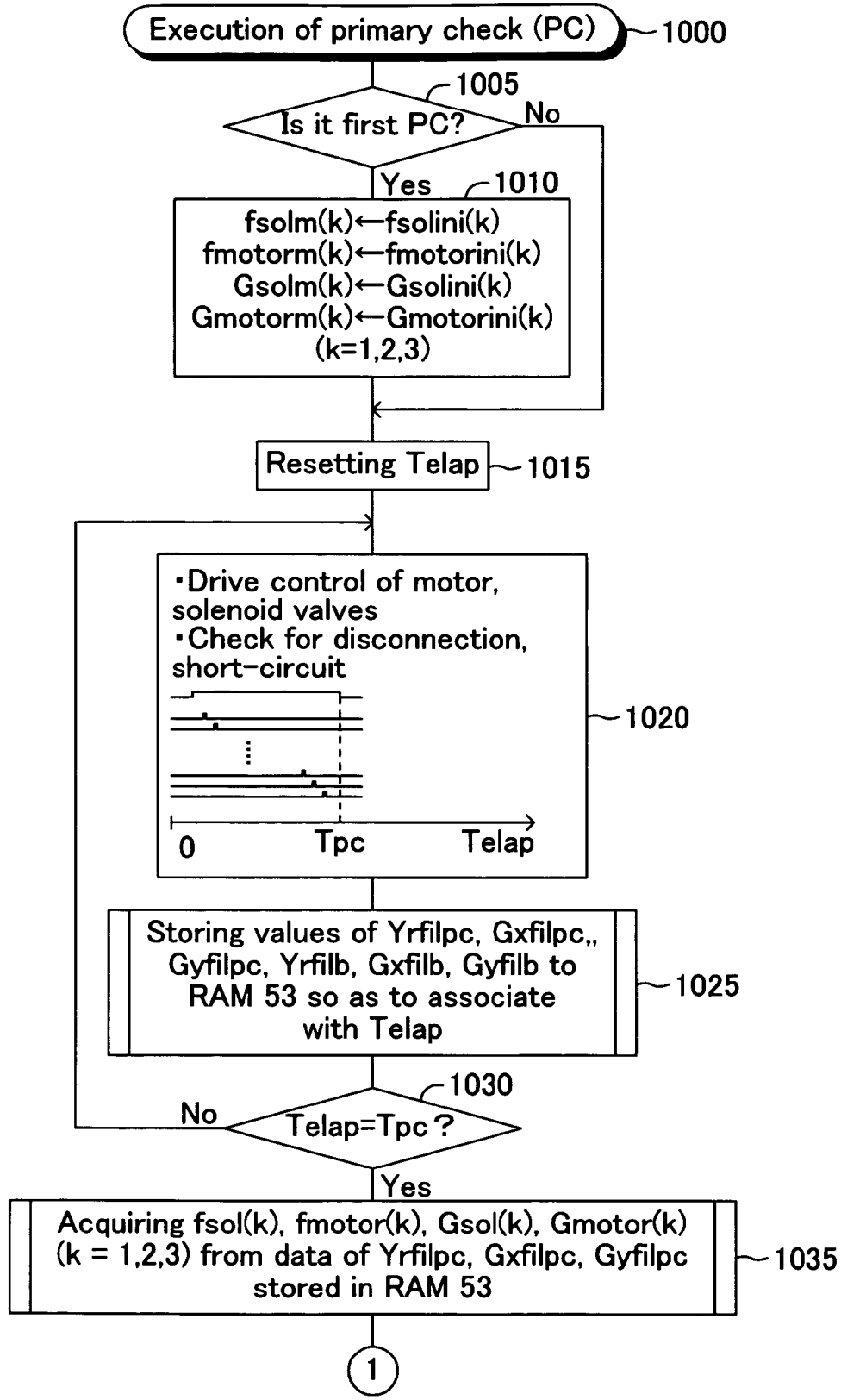
FIG. 10 is a first half of a flowchart showing a routine of a primary check executed by the CPU shown in FIG. 1.
Figure 11:
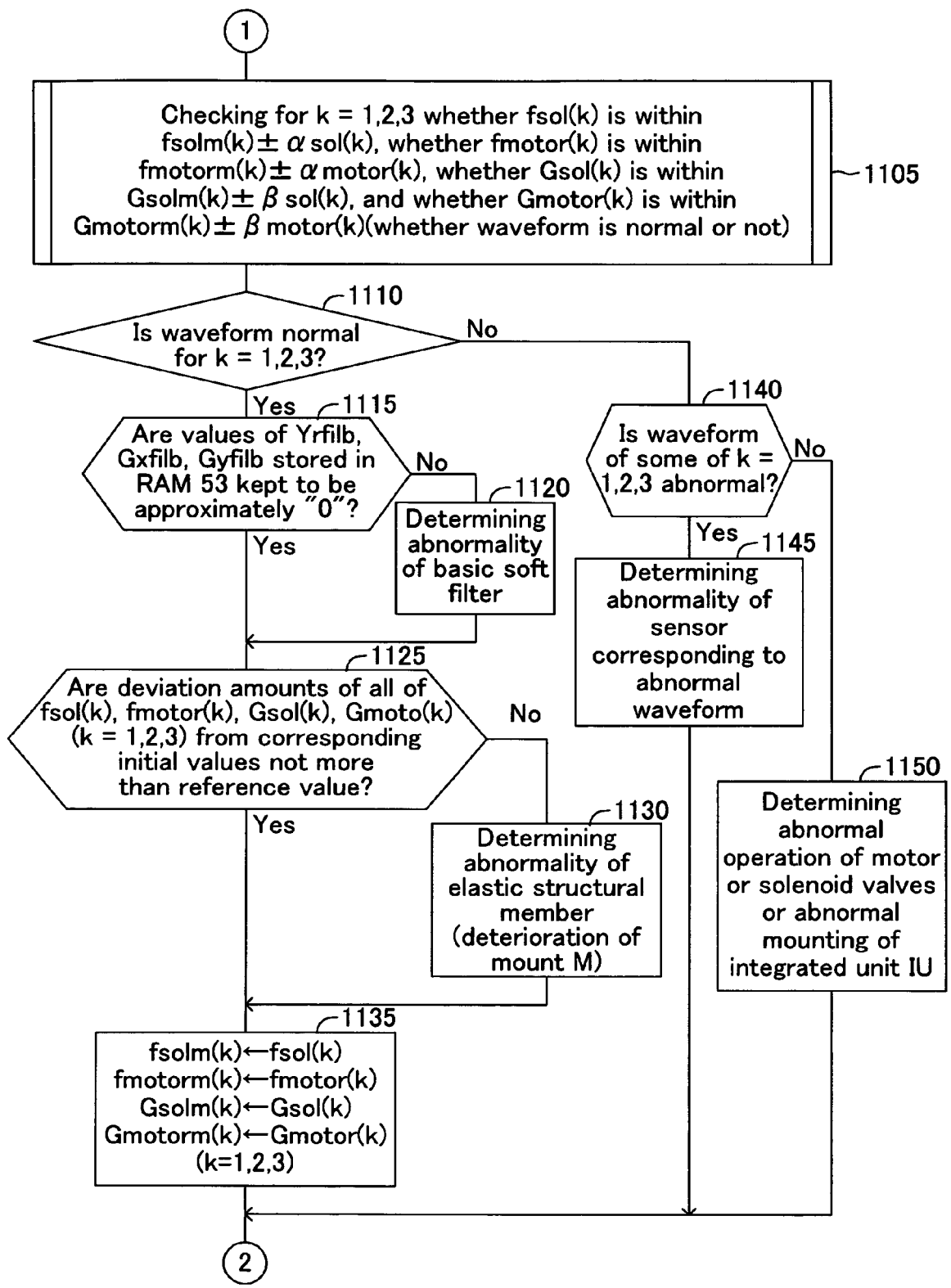
FIG. 11 is a middle part of the flowchart showing the routine of the primary check executed by the CPU shown in FIG. 1.
Figure 12:
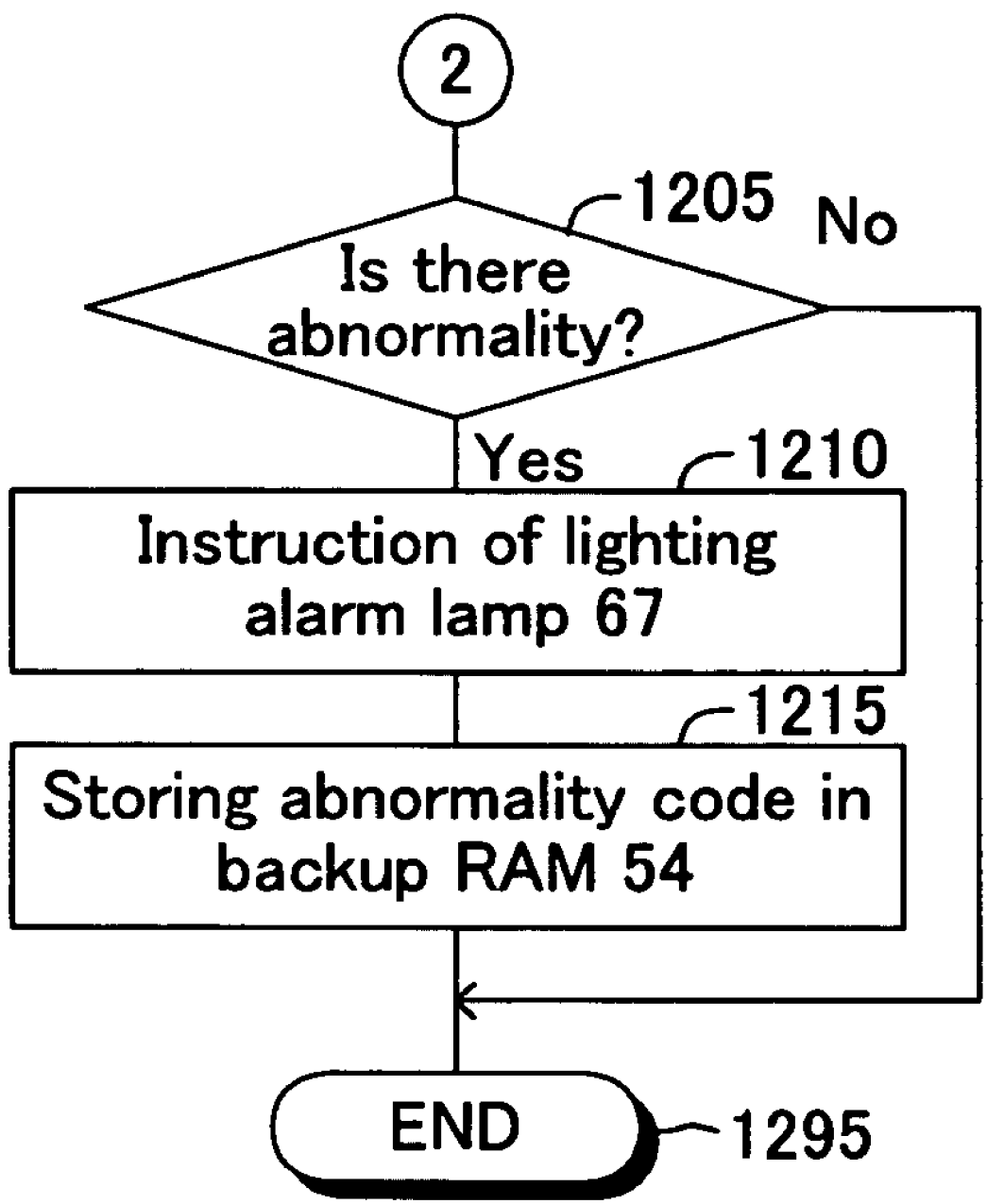
FIG. 12 is a second half of the flowchart showing the routine of the primary check executed by the CPU shown in FIG. 1.

When the primary check start condition is established, the CPU 51 starts from Step 1000 a series of routines shown in FIGS. 10 to 12 executing the primary check. Specifically, when the CPU 51 proceeds to Step 1005 from Step 1000, it determines whether this primary check is the first time or not. The "first time" means here the first primary check of the members (especially, mount M) of the HU 40 that are brand-new.

When the primary check this time is the first time, the CPU 51 makes "Yes" determination at Step 1005, and then, proceeds to Step 1010 to respectively set the memorized value fsolm(k) of the frequency fsol(k), memorized value fmotorm(k) of the frequency fmotor(k), memorized value Gsolm(k) of the gain Gsol(k), and memorized value Gmotorm(k) of the gain Gmotor(k) to the initial value fsolini(k) of the frequency fsol(k), initial value fmotorini(k) of the frequency fmotor(k), initial value Gsolini(k) of the gain Gsol(k) and initial value Gmotorini(k) of the gain Gmotor(k) (k=1, 2, 3), those of which are stored in the ROM 52. Thereafter, the CPU 51 proceeds to Step 1015.

The initial values fsolini(k), fmotorini(k), Gsolini(k), and Gmotorini(k) (k=1, 2, 3) respectively correspond to fsol, fmotor, Gsol, and Gmotor shown in FIG. 9 when the primary check is executed with the mount M being brand-new.

Further, the memorized values fsolm(k), fmotorm(k), Gsolm(k), and Gmotorm(k) (k=1, 2, 3) are used as the center values of the normal range (the above-mentioned specific frequency range, and specific gain range) of each value corresponding to the foregoing "normal pattern range" in the "determination as to whether the waveform is normal or not" at Step 1105 described later. Additionally, the average value of the memorized value fsolm(k) (k=1, 2, 3) and the average value of the memorized value fmotorm(k) (k=1, 2, 3) are used as the center values (fsol and fmotor in FIG. 5) in the frequency band in which the passage is allowed by the PC-use soft filter. Specifically, when the "memorized values" are changed, the reference value for "the determination as to whether the waveform is normal or not" at Step 1105 and the frequency—gain characteristic of the PC-use soft filter also vary.

On the other hand, when the primary check this time is the second time and later primary check, the CPU 51 makes "No" determination at Step 1005, and directly proceeds to Step 1015.

When the CPU 51 proceeds to Step 1015, it resets the elapsed time Telap to "0". The elapsed time Telap is the elapsed time from the start of the primary check (the elapsed time from the time t0 in FIG. 6), and it is counted by an unillustrated timer incorporated into the electronic control apparatus 50.

Subsequently, the CPU 51 proceeds to Step 1020 to successively generate drive signals for the motor MT (hydraulic pumps HP1 and HP2) and the various solenoid valves in the HU 40 in accordance with the drive signal generating pattern shown in FIG. 6 according to the elapsed time Telap (the elapsed time from the time t0 in FIG. 6). Simultaneously, the CPU 51 successively checks whether abnormality such as disconnection, short-circuit, or the like occurs in the drive circuits in the various actuators. Specifically, the primary check is started. Therefore, each actuator in the HU 40 can successively be driven afterward according to the drive signal generating pattern shown in FIG. 6.

Then, the CPU 51 proceeds to Step 1025 to respectively acquire the yaw-rate-after-PC-filter-process Yrfilpc, longitudinal-acceleration-after-PC-filter-process Gxfilpc, lateral-acceleration-after-PC-filter-process Gyfilpc, yaw-rate-after-basic-filter-process Yrfilb, longitudinal-acceleration-after-basic-filter-process Gxfilb, and lateral-acceleration-after-basic-filter-process Gyfilb, and stores the acquired values into the RAM 53 so as to associate with the elapsed time Telap.

Next, the CPU 51 proceeds to Step 1030 to determine whether the elapsed time Telap reaches the primary check end time Tpc (see FIG. 6). The CPU 51 repeatedly executes the processes at Step 1020 and Step 1025 so long as "No" determination is made. Thus, the variation pattern (see FIG. 9) for each of the yaw-rate-after-PC-filter-process Yrfilpc, longitudinal-acceleration-after-PC-filter-process Gxfilpc, and lateral-acceleration-after-PC-filter-process Gyfilpc, and the variation pattern (see FIG. 8) for each of the yaw-rate-after-basic-filter-process Yrfilb, longitudinal-acceleration-after-basic-filter-process Gxfilb, and lateral-acceleration-after-basic-filter-process Gyfilb are acquired and stored in accordance with the elapsed time Telap.

When the elapsed time Telap reaches the time Tpc (i.e., when the primary check is ended), the CPU 51 makes "Yes" determination when proceeding to Step 1030, and then, proceeds to Step 1035 so as to acquire fsol(k), fmotor(k), Gsol (k), and Gmotor(k) (k=1, 2, 3), each corresponding to fsol, fmotor, Gsol, and Gmotor in FIG. 9, on the basis of the data of each of the variation patterns for the yaw-rate-after-PC-filter-process Yrfilpc, longitudinal-acceleration-after-PC-filter-process Gxfilpc, and lateral-acceleration-after-PC-filter-process Gyfilpc stored in the RAM 53, by utilizing, for example, an analyzing technique such as FET or the like.

Then, the CPU 51 proceeds to Step 1105 in FIG. 11 to determine whether the waveform of each of the variation patterns for the yaw-rate-after-PC-filter-process Yrfilpc, longitudinal-acceleration-after-PC-filter-process Gxfilpc, and lateral-acceleration-after-PC-filter-process Gyfilpc is normal or not by utilizing the acquired fsol(k), fmotor(k), Gsol(k), and Gmotor(k) (k=1, 2, 3).

Specifically, only when the acquired fsol(k) is within fsolm(k)$\pm\alpha$sol(k), the acquired fmotor(k) is within fmotorm(k)$\pm\alpha$motor(k), the acquired Gsol(k) is within Gsolm(k)$\pm\beta$sol(k), and the acquired Gmotor(k) is within Gmotorm(k)$\pm\beta$motor(k), it is determined that the waveform of the variation pattern for the output from the sensors corresponding to "k=k" in the vehicle behavior sensors 64, 65, and 66 is normal.

The memorized values fsolm(k), fmotorm(k), Gsolm(k), and Gmotorm(k) (k=1, 2, 3) used here are equal to the initial values fsolini(k), fmotorini(k), Gsolini(k), and Gmotorini(k) (k=1, 2, 3) due to the process at Step 1010, when the primary check this time is the first time. On the other hand, when the primary check this time is the second time and later, these values are updated upon the previous execution of the present routine at Step 1135 described later.

Then, the CPU 51 proceeds to Step 1110 to determine whether the waveform is normal or not for all the cases of k=1, 2, 3. When the CPU 51 makes "Yes" determination, it proceeds to Step 1115 so as to determine whether all of the yaw-rate-after-basic-filter-process Yrfilb, longitudinal-acceleration-after-basic-filter-process Gxfilb, and lateral-acceleration-after-basic-filter-process Gyfilb stored in the RAM 53 are kept to be approximately "0" over the primary check.

In this case (i.e., when all the waveforms of the variation patterns of the outputs from the vehicle behavior sensors 64, 65 and 66 are normal), the above-mentioned respective values must be kept to be approximately "0" as shown in FIG. 8, if the basic soft filter is normal. Therefore, when the CPU 51 makes "No" determination at Step 1115, it proceeds to Step 1120 to determine that "the basic soft filter is abnormal".

Next, the CPU 51 proceeds to Step 1125 so as to determine whether all of the deviation amounts from the initial values (see Step 1010) corresponding to fsol(k), fmotor(k), Gsol(k), and Gmotor(k) (k=1, 2, 3) acquired at the previous Step 1035 are not more than a prescribed reference value or not.

As described above, fsol(k), fmotor(k), Gsol(k), and Gmotor(k) (k=1, 2, 3) deviates from the corresponding initial values (see Step 1010) according to the progress of the deterioration of the mount M. Therefore, when the deviation amount exceeds the prescribed reference value, it can be determined that the mount M is "deteriorated". Accordingly, when the CPU 51 makes "No" determination at Step 1125, the CPU 51 proceeds to Step 1130 to makes a determination of "abnormality of the elastic structural member (especially, deterioration of the mount M)".

Then, the CPU 51 proceeds to Step 1135 to update the memorized values fsolm(k), fmotorm(k), Gsolm(k), and Gmotorm(k) (k=1, 2, 3) to fsol(k), fmotor(k), Gsol(k), and Gmotor(k) (k=1, 2, 3) acquired at the previous Step 1035, and then, proceeds to the routine shown in FIG. 12.

The memorized values fsolm(k), fmotorm(k), Gsolm(k), and Gmotorm(k) updated as described above are used during the next execution of the present routine at Step 1105. Additionally, in response to the execution of Step 1135, the center values (fsol, fmotor in FIG. 5) of the frequency band in which the passage is allowed by the PC-use soft filter are updated to the average value of the memorized values fsolm(k) (k=1, 2, 3) and the average value of the memorized values fmotorm(k) (k=1, 2, 3) thus updated.

On the other hand, when the CPU 51 makes "No" determination at Step 1110 (i.e., when not all the waveforms of the variation patterns of the outputs from the vehicle behavior sensors 64, 65 and 66 are normal), the CPU 51 proceeds to Step 1140 to determine whether the waveform is abnormal or not for some cases of k=1, 2, 3.

The fact that the waveform of the variation pattern of the output from at least one of the vehicle behavior sensors 64, 65 and 66 is normal is considered to indicate that the abnormality involved in the integrated unit IU other than the vehicle behavior sensors 64, 65 and 66 does not occur. Specifically, when the waveform of the variation pattern of the output from some of the vehicle behavior sensors 64, 65 and 66 is abnormal, it is considered that abnormality occurs on the vehicle behavior sensor whose waveform is determined to be abnormal.

On the other hand, it is rare that the abnormality occurs simultaneously on the vehicle behavior sensors 64, 65 and 66. Therefore, when the waveform of each of the variation patterns of the outputs from all of the vehicle behavior sensors 64, 65 and 66 is abnormal, it is considered that the abnormality involved in the integrated unit IU other than the vehicle behavior sensors 64, 65 and 66 occurs.

From the above, when the CPU 51 makes "Yes" determination at Step 1140, the CPU 51 proceeds to Step 1145 to make a determination of "abnormality on the vehicle behavior sensors according to the abnormality of the waveform". On the other hand, when the CPU makes "No" determination at Step 1140, it proceeds to Step 1150 to make a determination of "abnormal operation of the motor or solenoid valves" or "abnormal mounting of the integrated unit IU". Examples of the "abnormal mounting of the integrated unit IU" include abnormal connection of the above-mentioned six pipes connected to the HU 40, abnormal mounting of the bracket BR or mount M to the vehicle body, abnormal mounting of the integrated unit IU to the mount M, or the like.

Next, the CPU 51 proceeds to Step 1205 in FIG. 12 to determine whether there is a "presence of abnormality" or not. When the CPU 51 makes "No" determination, it directly proceeds to Step 1295 to end the present routine. The "presence of abnormality" specifically means here that "abnormality" is determined on at least one of Steps 1120, 1130, 1145, and 1150, and/or "abnormality such as disconnection, short-circuit, or the like" is determined in the primary check at Step 1020.

When the CPU 51 makes "Yes" determination at Step 1205, it proceeds to Step 1210 to transmit the lighting signal to the alarm lamp 67, and at the subsequent Step 1215, stores an abnormality code according to the content of the abnormality in the backup RAM 54. Thereafter, the CPU 51 proceeds to Step 1295 to end the present routine. As a result, the alarm lamp 67 lights in the case of the "presence of abnormality". Accordingly, a user of the vehicle can find the content of the abnormality by reading out the abnormality code stored in the backup RAM 54, whereby the user can promptly take an action according to the content of the abnormality.

After that, until the primary check start condition is again established by changing the ignition switch from OFF to ON again after it is changed from ON to OFF, the present routine is not again executed.

As explained above, the abnormality determining apparatus of a vehicle motion control apparatus according to the embodiment of the present invention is applied to a vehicle motion control apparatus having vehicle behavior sensors 64, 65 and 66 integrally mounted to the integrated unit IU that is integrally composed of the HU 40 and ECU 50. In the abnormality determining apparatus, the pattern of the vibration noise appearing on the outputs from the vehicle behavior sensors 64, 65 and 66 is acquired (see Step 1025, FIG. 9) when the motor MT and various actuators such as solenoid valves mounted to the HU 40 are operated with a predetermined pattern for the primary check of the HU 40. When the pattern of the vibration noise is not within the normal pattern range (when "No" determination is made at Step 1110), it is determined that the abnormality on the vehicle behavior sensors 64, 65 and 66, abnormal operation of the actuators in the HU 40, or the like is produced according to the abnormal manner of the pattern of the vibration noise.

The present invention is not limited to the above-mentioned embodiment, and various modifications can be made within a scope of the present invention. For example, although the abnormality involved in the integrated unit IU is determined on the basis of the pattern of the vibration noise of the outputs from the vehicle behavior sensors 64, 65 and 66 during the primary check for the HU 40, the abnormality involved in the integrated unit IU may be determined on the basis of the pattern of the vibration noise of the outputs from the vehicle behavior sensors 64, 65 and 66 acquired when various actuators mounted to the HU 40 are operated with a predetermined pattern at the stage other than the primary check for the HU 40.

Although three sensors, i.e., yaw rate sensor, longitudinal acceleration sensor, and lateral acceleration sensor are used as the vehicle behavior sensor in the aforesaid embodiment, an optional one sensor or optional two sensors may be used as the vehicle behavior sensor instead of these three sensors. Alternatively, instead of these three sensors or in addition to these three sensors, roll rate sensor, pitch rate sensor, and normal acceleration sensor may be used.

In the aforesaid embodiment, the pattern of the vibration noise is determined to be normal or not (see Step 1105) by utilizing whether all of the frequencies and gains (fsol, fmotor, Gsol, Gmotor) corresponding to the operation of the actuators are within a prescribed range or not in the pattern of the vibration noise of the vehicle behavior sensors acquired during the primary check for the HU 40. However, the pattern of the vibration noise may be determined to be normal or not by utilizing whether either one of the frequency and gain (fsol and fmotor, or Gsol and Gmotor in FIG. 9) corresponding to the operation of the actuators is within the prescribed range or not.

Although one PC-use soft filter is used for all outputs (Yrdigi, Gxdigi, Gydigi) from the vehicle behavior sensors 64, 65 and 66 in the aforesaid embodiment, different PC-use soft filters independent for each output (Yrdigi, Gxdigi, Gydigi) from the vehicle behavior sensors 64, 65 and 66 may be used. In this case, it is preferable that the center values (fsol, fmotor in FIG. 5) in the frequency band in which the passage is allowed by each of the PC-use soft filters are updated to the corresponding memorized values fsolm(k), fmotorm(k) themselves successively updated at Step 1135.

In the aforesaid embodiment, when even one of the deviation amounts from the initial values (see Step 1010) corresponding to fsol(k), fmotor(k), Gsol(k), and Gmotor(k) (k=1, 2, 3) acquired at the previous Step 1035 exceeds the prescribed reference value, it is determined that the elastic structural member is abnormal. However, only when all of the deviation amounts exceed the prescribed reference value, it may be determined that the elastic structural member is abnormal.

In the foregoing embodiment, the yaw-rate-after-basic-filter-process Yrfilb, longitudinal-acceleration-after-basic-filter-process Gxfilb, and lateral-acceleration-after-basic-filter-process Gyfilb are acquired in addition to the yaw-rate-after-PC-filter-process Yrfilpc, longitudinal-acceleration-after-PC-filter-process Gxfilpc, and lateral-acceleration-after-PC-filter-process Gyfilpc over the primary check. However, only after a prescribed stage during the primary check, the yaw-rate-after-basic-filter-process Yrfilb, longitudinal-acceleration-after-basic-filter-process Gxfilb, and lateral-acceleration-after-basic-filter-process Gyfilb may be acquired. With this configuration, the filter process by the basic soft filter can be discontinued from the start of the primary check to the prescribed stage, whereby the operation load of the CPU 51 can be reduced.

Although the cut-off frequency f1 (see FIG. 5) of the basic soft filter is constant in the above-mentioned embodiment, the resonance frequency of the integrated unit IU may be obtained on the basis of the pattern of the vibration noise of the vehicle behavior sensors 64, 65 and 66 acquired during the primary check for the HU 40, and the cut-off frequency f1 of the basic soft filter may be corrected so as to be always smaller than the obtained resonance frequency. With this configuration, even when the resonance occurs on the integrated unit IU during when the vehicle is running, the malfunction of the vehicle motion control (OS-US suppression control) can surely be prevented.

Additionally, in the aforesaid embodiment, the vehicle behavior sensors 64, 65 and 66 are incorporated in the integrated unit IU composed integrally of the HU 40 (control unit) and the ECU 50 (electronic control apparatus. However, a control unit having incorporated therein the vehicle behavior sensors 64, 65 and 66 and an electronic control apparatus are different from each other.

What is claimed is:

1. An abnormality determining apparatus of a vehicle motion control apparatus comprising:
    a control unit having an actuator for controlling the motion of the vehicle, the control unit being mounted to a vehicle body via an elastic structural member;
    a vehicle behavior sensor integrally mounted to the control unit and outputting a signal indicating a behavior of the vehicle;
    control means for controlling the actuator on the basis of the output from the vehicle behavior sensor for controlling the motion of the vehicle; and
    abnormality determining means for determining whether abnormality involved in the motion control apparatus occurs or not on the basis of whether a variation pattern of the output from the vehicle behavior sensor is within a predetermined normal pattern range or not during a time that the actuator is operated with a predetermined pattern.

2. An abnormality determining apparatus of a vehicle motion control apparatus according to claim 1, wherein the abnormality determining means is configured to determine whether abnormality occurs or not on the vehicle behavior sensor as the abnormality involved in the motion control apparatus.

3. An abnormality determining apparatus of a vehicle motion control apparatus according to claim 1, wherein the abnormality determining means is configured to determine whether abnormal operation of the actuator occurs or not as the abnormality involved in the motion control apparatus.

4. An abnormality determining apparatus of a vehicle motion control apparatus according to claim 1, wherein the abnormality determining means is configured to determine whether abnormality involved in mounting the control unit occurs or not as the abnormality involved in the motion control apparatus.

5. An abnormality determining apparatus of a vehicle motion control apparatus according to claim 4, wherein the abnormality determining means is configured to determine that the abnormality involved in the motion control apparatus occurs, when a frequency corresponding to the operation of the actuator, that is obtained on the basis of the variation pattern of the output from the vehicle behavior sensor, is out of a specific frequency range, and/or when a gain of a component of the frequency corresponding to the operation of the actuator, that is obtained on the basis of the variation pattern of the output from the vehicle behavior sensor, is out of a specific gain range.

6. An abnormality determining apparatus of a vehicle motion control apparatus according to claim 5, wherein the abnormality determining means is configured to correct the specific frequency range that is used for the next determination of abnormality on the basis of the frequency corresponding to the operation of the actuator, that is obtained this time based upon the variation pattern of the output from the vehicle behavior sensor, and/or to correct the specific gain range that is used for the next determination of abnormality on the basis of the gain of the component of the frequency corresponding to the operation of the actuator, that is obtained this time based upon the variation pattern of the output from the vehicle behavior sensor.

7. An abnormality determining apparatus of a vehicle motion control apparatus according to claim 5, wherein the abnormality determining means is configured to determine that the abnormality of the elastic structural member occurs as the abnormality involved in the motion control apparatus, when a deviation amount, from a corresponding initial value, of the frequency corresponding to the operation of the actuator, that is obtained based upon the variation pattern of the output from the vehicle behavior sensor, exceeds a reference value, and/or when a deviation amount, from a corresponding initial value, of the gain of the component of the frequency corresponding to the operation of the actuator, that is obtained based upon the variation pattern of the output from the vehicle behavior sensor, exceeds a reference value.

8. An abnormality determining apparatus of a vehicle motion control apparatus according to claim 1, wherein the control unit has mounted thereto plural vehicle behavior sensors, and the abnormality determining means is configured to determine that abnormality occurs on some of the plural vehicle behavior sensors as the abnormality involved in the motion control apparatus, when the variation pattern of the output from the some of the plural vehicle behavior sensors is out of the normal pattern range.

9. An abnormality determining apparatus of a vehicle motion control apparatus according to claim 1, wherein
the control unit has mounted thereto plural vehicle behavior sensors, and
the abnormality determining means is configured to determine that abnormality involved in the motion control unit other than the plural vehicle behavior sensors occurs as the abnormality involved in the motion control apparatus, when the variation patterns of the outputs from all of the plural vehicle behavior sensors are out of the normal pattern ranges.

10. An abnormality determining apparatus of a vehicle motion control apparatus according to claim 1, wherein
the abnormality determining means is provided with a filter, which is a filter for determining abnormality, that passes only a frequency band, corresponding to the operation of the actuator, in the output from the vehicle behavior sensor, and
the abnormality determining means is configured to use a variation pattern of a value obtained by providing a filter process to the output from the vehicle behavior sensor by the filter for determining abnormality, instead of the variation pattern of the output from the vehicle behavior sensor.

11. An abnormality determining apparatus of a vehicle motion control apparatus according to claim 1, wherein
the control means is provided with a filter, which is a basic filter, that passes only a frequency band, which should be used for the motion control of the vehicle, in the output from the vehicle behavior sensor, and configured to control the actuator on the basis of a value obtained by providing a filter process to the output from the vehicle behavior sensor by the basic filter,
the abnormality determining means is configured to determine whether abnormality occurs or not on a function of the basic filter on the basis of a variation pattern of a value obtained by providing the filter process to the output from the vehicle behavior sensor by the basic filter, during a time that the actuator is operated with the predetermined pattern.

12. An abnormality determining apparatus of a vehicle motion control apparatus according to claim 11, wherein
the control means is configured to correct the frequency band, which should be used for the motion control of the vehicle, in the basic filter on the basis of the variation pattern of the output from the vehicle behavior sensor obtained by the abnormality determining means.

13. An abnormality determining apparatus of a vehicle motion control apparatus according to claim 1, wherein
the abnormality determining means is configured to determine whether the abnormality involved in the motion control apparatus occurs or not by operating the actuator with the predetermined pattern at a prescribed timing immediately after a beginning of an electric power supply to the motion control apparatus.

* * * * *